US008453236B2

(12) United States Patent
Seifert et al.

(10) Patent No.: US 8,453,236 B2
(45) Date of Patent: *May 28, 2013

(54) TAMPER-AWARE VIRTUAL TPM (75) Inventors: Jean-Pierre Seifert, Hillsboro, OR (US); Ryan R. Ware, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 937 days.

This patent is subject to a terminal disclaimer.

(21) Appl. No.: 12/553,797

(22) Filed: Sep. 3, 2009

(65) Prior Publication Data

US 2010/0037315 A1 Feb. 11, 2010

Related U.S. Application Data (63) Continuation of application No. 11/173,776, filed on Jun. 30, 2005, now Pat. No. 7,603,707.

(51) Int. Cl.
*G06F 21/00* (2006.01)

(52) U.S. Cl.
USPC ............................................. 726/22; 713/164

(58) Field of Classification Search
USPC ..................... 726/22; 713/166, 164
See application file for complete search history.

(56) References Cited

U.S. PATENT DOCUMENTS

| 5,530,758 | A | * | 6/1996 | Marino et al. | 713/150 |
|---|---|---|---|---|---|
| 5,692,193 | A | * | 11/1997 | Jagannathan et al. | 718/106 |
| 5,974,549 | A | * | 10/1999 | Golan | 726/23 |
| 6,098,171 | A | * | 8/2000 | Johnson et al. | 726/16 |
| 6,256,775 | B1 | * | 7/2001 | Flynn | 717/127 |
| 6,594,774 | B1 | * | 7/2003 | Chapman et al. | 714/2 |
| 6,718,489 | B1 | * | 4/2004 | Lee et al. | 714/43 |
| 6,961,855 | B1 | * | 11/2005 | Rich et al. | 726/1 |
| 7,003,775 | B2 | * | 2/2006 | Lacombe et al. | 719/313 |
| 7,069,543 | B2 | * | 6/2006 | Boucher | 717/127 |
| 7,149,900 | B2 | * | 12/2006 | Rothrock | 713/189 |
| 7,162,666 | B2 | * | 1/2007 | Bono | 714/51 |
| 7,216,369 | B2 | * | 5/2007 | Wiseman et al. | 726/34 |
| 7,318,150 | B2 | * | 1/2008 | Zimmer et al. | 713/2 |
| 7,360,200 | B2 | * | 4/2008 | Boucher | 717/100 |
| 7,971,255 | B1 | * | 6/2011 | Kc et al. | 726/24 |

(Continued)

OTHER PUBLICATIONS

"Trusted Computing Group", https://www.trustedcomputinggroup.org/home; retrieved Feb. 23, 2009; Trusted Computing Group copyright 2009; 3 pages.

(Continued)

*Primary Examiner* — David García Cervetti
(74) *Attorney, Agent, or Firm* — Blakely, Sokoloff, Taylor & Zafman LLP (57) ABSTRACT

Methods, software/firmware and apparatus for implementing a tamper-aware virtual trusted platform module (TPM). Under the method, respective threads comprising a virtual TPM thread and a security-patrol threads are executed on a host processor. In one embodiment, the host processor is a multi-threaded processor having multiple logical processors, and the respective threads are executed on different logical processors. While the virtual TPM thread is used to perform various TPM functions, the security-patrol thread monitors for physical attacks on the processor by implementing various numerical calculation loops, wherein an erroneous calculation is indicative of a physical attack. In response to detection of such an attack, various actions can be taken in view of one or more predefined security policies, such as logging the event, shutting down the platform and/or informing a remote management entity.

23 Claims, 4 Drawing Sheets

U.S. PATENT DOCUMENTS

| | | | |
|---|---|---|---|
| 2003/0037172 A1* | 2/2003 | Lacombe et al. | 709/310 |
| 2003/0074548 A1* | 4/2003 | Cromer et al. | 713/1 |
| 2003/0084285 A1* | 5/2003 | Cromer et al. | 713/164 |
| 2003/0110372 A1* | 6/2003 | Proudler | 713/150 |
| 2003/0120896 A1* | 6/2003 | Gosior et al. | 712/32 |
| 2003/0126442 A1* | 7/2003 | Glew et al. | 713/170 |
| 2003/0126453 A1* | 7/2003 | Glew et al. | 713/193 |
| 2004/0003288 A1* | 1/2004 | Wiseman et al. | 713/201 |
| 2004/0073806 A1* | 4/2004 | Zimmer | 713/189 |
| 2004/0073891 A1* | 4/2004 | Boucher | 717/127 |
| 2004/0117620 A1* | 6/2004 | Rothrock | 713/164 |
| 2004/0230794 A1* | 11/2004 | England et al. | 713/164 |
| 2005/0033978 A1* | 2/2005 | Hyser | 713/200 |
| 2005/0108564 A1* | 5/2005 | Freeman et al. | 713/200 |
| 2005/0166024 A1* | 7/2005 | Angelo et al. | 711/164 |
| 2005/0223221 A1* | 10/2005 | Proudler et al. | 713/164 |
| 2005/0223302 A1* | 10/2005 | Bono | 714/55 |
| 2005/0246521 A1* | 11/2005 | Bade et al. | 713/150 |
| 2005/0246525 A1* | 11/2005 | Bade et al. | 713/164 |
| 2005/0251857 A1* | 11/2005 | Schunter et al. | 726/16 |
| 2005/0268093 A1* | 12/2005 | Proudler | 713/164 |
| 2006/0026418 A1* | 2/2006 | Bade et al. | 713/150 |
| 2006/0026419 A1* | 2/2006 | Arndt et al. | 713/150 |
| 2006/0026422 A1* | 2/2006 | Bade et al. | 713/164 |
| 2006/0112267 A1* | 5/2006 | Zimmer et al. | 713/164 |
| 2006/0147043 A1* | 7/2006 | Mann et al. | 380/270 |
| 2006/0156008 A1* | 7/2006 | Frank | 713/176 |
| 2006/0184842 A1* | 8/2006 | Boucher | 714/55 |
| 2006/0212939 A1* | 9/2006 | England et al. | 726/22 |
| 2006/0236127 A1* | 10/2006 | Kurien et al. | 713/193 |
| 2006/0259782 A1* | 11/2006 | Wang et al. | 713/189 |
| 2007/0192597 A1* | 8/2007 | Bade et al. | 713/167 |

OTHER PUBLICATIONS

Loscocco, Peter A., et al., "The Inevitability of Failure: The Flawed Assumption of Security in Modern Computing Environments", National Security Agency, 21st NISSC Proceedings: Papers, Oct. 6-9, 1998; Crystal City, Virginia, 12 pages. (Oct. 6, 1998).

USPTO, "First Office Action", U.S Appl. No. 11/173,776, Mailed Nov. 24, 2008, 8 pages.

USPTO, "Notice of Allowance", U.S. Appl. No. 11/173,776, Mailed Jun. 1, 2009, 6 pages.

* cited by examiner

*Fig. 3*

TAMPER-AWARE VIRTUAL TPM

CROSS-REFERENCE TO RELATED APPLICATIONS

The present application is a Continuation of, and claims priority to and incorporates by reference in its entirety, the corresponding U.S. patent application Ser. No. 11/173,776 filed Jun. 30, 2005, and entitled "TAMPER-AWARE VIRTUAL TPM," and issued as U.S. Pat. No. 7,603,707 on Oct. 13, 2009.

FIELD OF THE INVENTION

The field of invention relates generally to security measures and, more specifically but not exclusively relates to techniques for detecting physical attacks while implementing a virtual trusted-platform module.

BACKGROUND INFORMATION

The past few years have seen an ever-increasing level of attacks on computer systems and servers. Malicious hackers spend hours on end trying to identify security holes via which they can embed viruses, Trojans, etc. Almost as soon as an operating system (OS) vendor publishes a security patch to defeat a particular attack scheme, the hackers have figured out another way to defeat the software. Once viruses and the like appear on servers, an entire network of computers is susceptible to attack by those viruses.

In addition to malicious attacks in which the intent is to cause widespread system damage, networks are also prone to security breaches that enable data to be "stolen." For example, recent attacks have been made on various electronic storefront servers to steal credit card information and other user information. These types of attacks have lead to an escalating need for substantially improved security measures.

In view of the severity and frequency of the foregoing, a new direction has been proposed to replace today's security paradigm. A more proactive approach to security is presently being designed into the next generation of operating systems, which are referred to as trusted operating systems (TOS), secure operating systems (SOS), and secure and trusted operating systems (STOS). Current security efforts suffer from the flawed assumption that adequate security can be provided in applications with the existing security mechanisms of mainstream operating systems. In reality, the need for secure operating systems is growing in today's computing environment due to substantial increases in connectivity and data sharing. The threats posed by the modern computing environment cannot be addressed without secure operating systems. Any security effort which ignores this fact can only result in a 'fortress built upon sand'.

In contrast to today's scheme of security mechanisms layered over an unsecure core (e.g., a mainstream OS), the new approach begins with a trusted core that may only be accessed by users having appropriate security credentials. In this context, it is noted that users are not limited to humans, but rather also include programmatic entities such as software applications and the like. A chain of trust is maintained by the TOS or STOS to ensure that only trustworthy users may access secured portions of the OS, while other unsecure portions do not require the same level of authentication to access. The end result is that unqualified access is denied.

Many of the foregoing security concerns are currently being addressed by various consortiums and the like. On such organization, the Trusted Computing Group (TCG) is an industry consortium concerned with platform and network security. The TCG has defined various security measures that are implemented using a TCG token comprising a trusted platform module (TPM). Generally, TPM functionality may be embodied as a hardware device (most common) or via software (i.e., a virtual TPM). For example, integrated circuits have been recently introduced to support TPM functionality, such as National Semiconductor's TCG-compliant security controller, or similar integrated circuits made by Atmel Corporation and Infineon Technologies AG. While hardware-based TPM devices provide built-in measures for detecting physical attacks, there are currently no commensurate measures available to software-based TPMs.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Embodiments of methods, software/firmware, and apparatus for effecting a tamper-aware virtual TPM are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments of the present invention described herein provide techniques for detecting physical attacks on platforms that implement virtual (i.e., software-based) TPMs. In order to better understand the operation and advantages of the embodiments, a discussion of general TPM functionality will first be discussed. Following this, details of schemes to detect physical attacks using virtual TPMs are disclosed.

The TCG main specification (Version 1.2, October, 2003—hereinafter alternatively referred to as the "version 1.2 Specification") is a platform-independent industry specification that covers trust in computing platforms in general. The TCG main specification defines a trusted platform subsystem that employs cryptographic methods when establishing trust. The trusted platform may be embodied as a device or devices (both physical or virtual), or may be integrated into some existing platform component or components. The trusted platform enables an authentication agent to determine the state of a platform environment and seal data particular to that platform environment. Subsequently, authentication data (e.g., integrity metrics) stored in a TPM may be returned in response to an authentication challenge to authenticate the platform.

The TPM specifications define a set of functions and a set of storage locations—both volatile and non-volatile. Any component can be said to provide TPM functionality if it can meet the following criteria: Perform the required set of functions; return the appropriate responses; and can hold the required volatile and non-volatile data. Since TPMs provide these functions and store information on behalf of other components within a platform, a TPM must be associated with that platform.

From the foregoing it can be seen that a TPM is a combination of its functions, the protection of those functions, and is associated with a platform. Although the TPM specifications provide thorough details on each TPM function and various protection measures, details for a given TPM implementation are left to the designers. For clarity, the following discussion of TPM functionality is described in the context as if the TPM is a hardware device. However, it will be understood that all of the functionality may be implemented via a virtual TMP.

Figure 1:
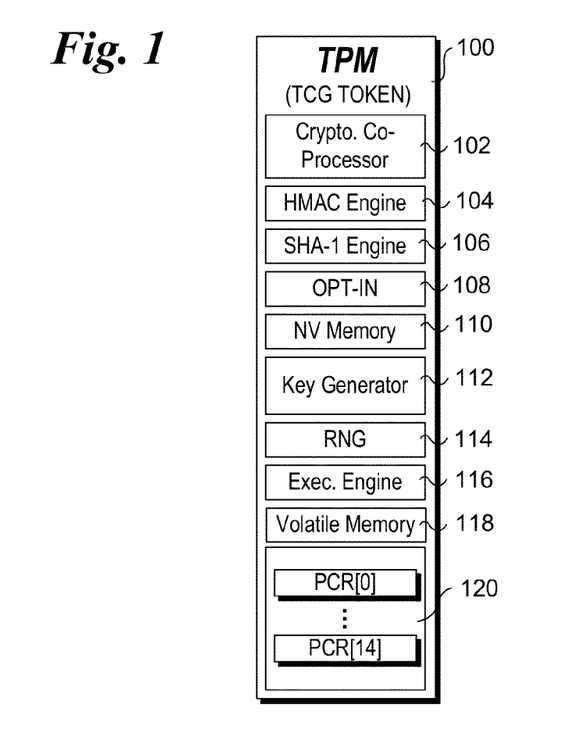
FIG. 1 is a block diagram illustrating various functional blocks provided by a trusted platform module (TPM)

Details of various functional blocks employed by a Version 1.2-compliant TPM 100 are shown in FIG. 1. TPM 100 provides several functions relating to security and privacy. These include a cryptographic co-processor 102, an HMAC (Hashing for Message Authentication code) engine 104, an SHA-1 (security hash algorithm-1) engine 106, an Opt-In component 108, non-volatile (NV) memory 110, a key generator 112, a random number generator (RNG) 114, an execution engine 116, volatile memory 118, and Platform Configuration Registers (PCRs) 120. Also provided in one TPM embodiment but not shown are an input/output component and a power detection component.

In general, security keys may be generated by key generator 112 or random number generator 114. HMAC engine 104 and SHA-1 engine 106 are used to perform hashing operations in accordance with the well-known HMAC and SHA-1 hashing algorithms. If desired, a TPM may perform encryption and decryption operations via cryptographic co-processor 102. More commonly, encryption and decryption operations will be performed by a dedicated cryptographic engine or cryptographic software running on a general-purpose processor or the like (e.g., platform processor).

The root of trust for reporting (RTR) is responsible for establishing platform identities, reporting platform configurations, protecting reported values, and establishing a context for attesting to reported values. The RTR employs a cryptographic identity in order to distinguish configuration reports and enable a challenger to authenticate the platform identity. The platform identity is an embodiment of all the roots of trust. A conventional identity ordinarily is a label that is unique within the context of an application domain. In contrast, a cryptographic identity is universally unique and non-guessable. To create such a cryptographic identity, it must be infeasible to guess an identity given a feedback loop for checking. Additionally, proof of possession of a cryptographic identity should be possible without disclosing it.

Platform uniqueness is achieved through an asymmetric key pair, known as the endorsement key (EK), which is embedded in the TPM. Use of the EK is restricted such that the only external representation of the platform is through aliases, known as attestation identities (and corresponding Attestation Identity Keys (AIKs). Prior to TPM use, a platform identity is created. The EK may be installed during platform manufacturing or generated by a vendor just before a customer takes delivery. TPM and platform manufacturers and their distributors determine the exact point in time when the EK is created. TPM and platform manufacturers are involved in EK creation because they vouch for the validity of the EK and TPM containing the EK.

An AIK is used as an alias for the EK, such that an EK is never revealed. AIKs are employed for signatures and not encryption. A TPM can create a virtually unlimited number of AIKs. Each AIK comprises an RSA 2048-bit asymmetric key pair. Per the Version 1.2 specification, AIKs are only permitted to sign data generated by a TPM. However, this is not limiting, but rather was chosen as part of an overall security policy.

A TPM uses "integrity metrics" to ascertain platform configuration. A "trusted measurement root" in the TPM measures certain platform characteristics, logs-in the measurement data, and stores the final result in a TPM (which contains the root of trust for storing and reporting integrity metrics). When an integrity challenge is received, the trusted platform agent gathers the following information: the final results from the TPM, the log of the measurement data from the trusted platform measurement store, and TCG validation data that states the values that the measurements should produce in a platform configured in accordance with the configuration that existed at the time the integrity measurements were sealed. The operations of making an identity and enabling key-pair generation enables TPM functionality to be employed for authentication purposes to support secure network data transfers.

As discussed above, hardware-based (i.e., physical) TPM devices provide built-in countermeasures to detect physical attacks. For example, a hardware-based TPM device may include provisions for protection against tampering attacks such as voltage spikes, frequency spikes, focused light, heating, freezing, etc., by employing a substantial number of corresponding silicon-embedded sensors that detect such attacks and provide corresponding alerts to the physical security-patrol elements of the TPM. In response, the TPM could log information pertaining to the attack and/or initiate a response event, such as shutting down a platform or otherwise implementing some type of security measure in view of a predefined security policy.

As discussed above, TPM functionality may be implemented via a virtual software TPM "device." It is important to define what is meant by software TPM. As stated in §4.2 Attributes of the TPM version 1.2 Specification, physical TPMs are already implemented using software. For the purpose of the present specification, a software or virtual TPM is a software-based entity (e.g., application or module(s)) that is implemented within a non-dedicated or general-purpose environment. For example, a TPM may be implemented either as a kernel or user-layer application executing within a general-purpose operating system (OS); a dynamically- or statically-liked library; or firmware within a device that provides other services to the platform.

A software TPM functions in a similar manner to the hardware-based TPM discussed and illustrated in the various TPM specifications, versions of which are available from the aforementioned vendors. In particular, the software TPM provides the same logical interfaces as a hardware TPM device to software/firmware entities that provide an interface between the TPM device and the platform OS. Specific details of these interfaces and functions are available in various TPM and TCG specifications.

In accordance with aspects of the embodiments now described, techniques are disclosed for identifying physical attacks on platforms that implement software-based TPMs. The techniques may be implemented on various types of processor architectures, without requiring changes to the processor silicon to embed sensors and the like. Additionally, the techniques present substantially no additional workload on the processor, and do not encumber execution of the software-based TPM itself.

In further detail, one aspect of the techniques concerns using multiple threads to effect both the TPM functionality and "tamper-aware" functionality. For example, under one embodiment, one thread is executed on a CPU (e.g., processor) to provide the actual (virtualized) TPM functionality, while a second thread functions as a security-patrol agent. This security-patrol thread simulates various TPM sensors by implementing program logic and functions that are employed to support detection of abnormal program execution. The security patrol thread operates in a manner that is independent of the TPM thread, and thus requires no modification to any existing or new TPM applications.

Another aspect of some embodiments is the implementing of the threads on a multi-threaded processor. For example, such a processor is exemplified by Intel's Hyper-Threading (HT) Technology and associated processor architecture. Hyper-Threading Technology enables multi-threaded software applications to execute threads in parallel, resulting in increased utilization of processor execution resources, and thus higher processing throughput. Hyper-Threading Technology is a form of simultaneous multi-threading technology (SMT), where multiple threads of software applications can be run simultaneously on one processor. This is achieved by duplicating the architectural state on each "logical" processor, while sharing one set of processor execution resources.

Figure 2:
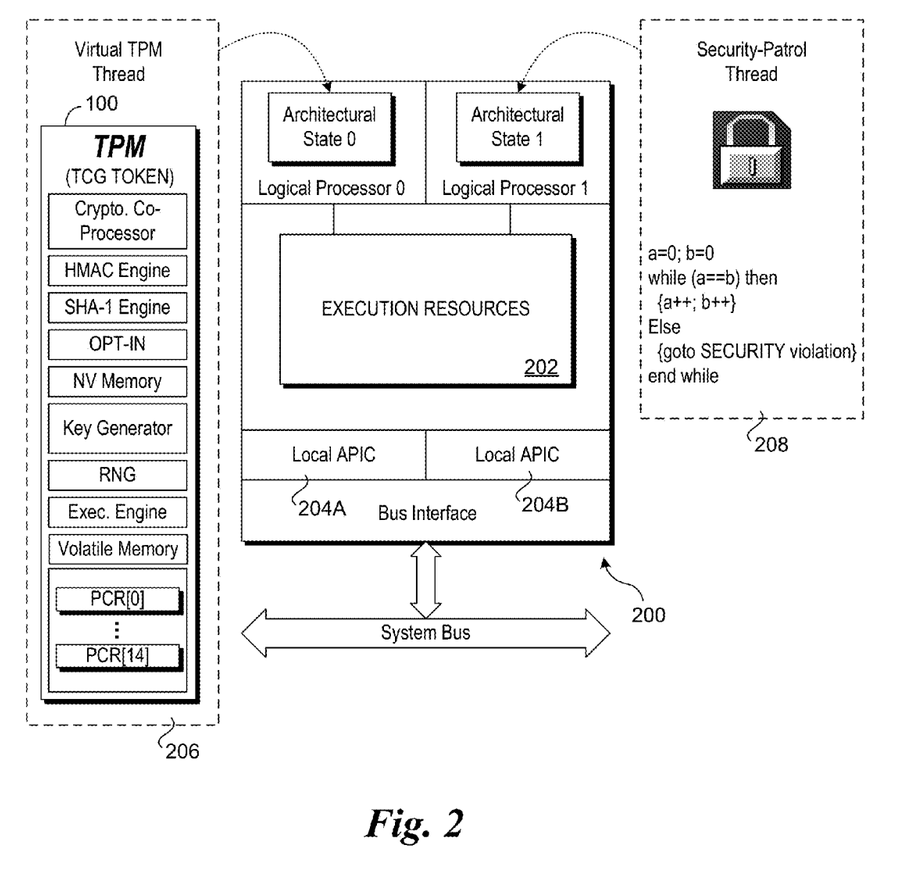
FIG. 2 is a schematic diagram illustrating the execution of a virtual TPM thread and a security-patrol thread on a multithreaded processor to support an implementation of a tamper-aware virtual TPM, according to one embodiment of the invention.

A high-level view of one implementation scheme using a HT processor 200 is shown in FIG. 2. Hyper-Threading Technology makes a single physical processor appear a multiple logical processors, as depicted by logical processors 0 and 1. To accomplish this, there is a copy of the architecture state for each logical processor, as depicted by architectural state 0 and architectural state 1, and the logical processors share a single set of physical execution resources 202. From a software or architecture perspective, this means operating systems and user programs can schedule processes or threads to logical processors as they would on conventional physical processors in a multi-processor system. From a microarchitecture perspective, this means that instructions from logical processors will persist and execute simultaneously on shared execution resources 202.

Each logical processor maintains a complete set of the architectural state, which includes general-purpose registers, control registers, advanced programmable interrupt controller (APIC) registers (depicted as local APIC registers 204A and 204B), and some machine state registers. The logical processors share nearly all other resources on the physical processor, such as caches, execution units, branch predictors, control logic, and buses.

In the illustrated embodiment of FIG. 2, a virtual TPM thread 206 that implements an instance of TPM 100 is executed on logical processor 0, while a security-patrol thread 208 is concurrently executed on logical processor 1. The execution of virtual TPM thread 206 provides similar TPM functionality to that which would be provided by a hardware TPM device, such that from the viewpoint of the software interfaces to the TPM (physical or virtual) device, the virtual TPM appears the same as a physical TPM device.

As discussed above, the physical TPM device provides built-in features to detect physical attacks; meanwhile, since the virtual TPM thread does not constitute a physical device, it cannot provide similar built-in features. To compensate for this, an instance of security-patrol thread 208 is concurrently executed on a separate logical processor (e.g., logical processor 1). The security-patrol thread is used to detect attacks on the virtual TPM host device, which in this case comprises HT processor 200. But rather than employ physical sensors, the security thread employs mathematical logic operations and the like (i.e., numerical calculations) to detect the present of an attack. This scheme operates under the following premise.

Under normal operating conditions, all of the logic elements (e.g., execution resources 202) of a processor will function properly, and thus all arithmetic and logic operations will result in correct calculations. Meanwhile, if a physical attack is made on the processor (e.g., via voltage spikes, frequency spikes, focused light, heating, freezing, etc.), the operation of a portion of the logic elements may fail (either temporarily or permanently if damaged). Accordingly, the failure of such local elements can be detected if processor computation and logic are performed to using such elements, wherein the computational results will be erroneous.

This scheme is conceptually illustrated by the following simplified pseudo code example.

```
a=0; b=0
while (a==b) then
    ({a++; b++)
else
    {goto SECURITY violation}
end while
```

In the while loop, an addition calculation (increment) is made to each of variables a and b. These operations are implemented on the physical processor using various processor resources, including registers, ALUs, etc, each of which is facilitated via corresponding logic elements comprising logic gates and the like. If the operation of a logic element is compromised due to a physical attack, it's resulting logical output may be erroneous. As a result, a corresponding calculation employing that logic element may produce an erroneous result, which can easily be detected using an appropriate numerical calculation loop.

In practice, the actual code used in the calculation loop would be much more sophisticated than that shown in the foregoing example. In further detail, such a numerical calculation loop should be designed to "test" as many processor resources as practical. Such resources may include, for example, processor caches, ALU's, special-purpose functional blocks (e.g., MMX, SSE, etc.), register banks, floating-point sections, etc. The general concept is to employ various portions of the physical processor while performing one or more ongoing calculations such that physical attacks that might affect the operation of those portions will be detected via corresponding erroneous calculation results.

In response to detection of such a physical attack, an appropriate action (i.e., predefined security policy) will be taken by executing an appropriate branch of the same security-patrol thread, or launching a separate thread coded for a corresponding function. For example, the security-patrol thread may be coded to enunciate an attack event by "tripping" a corresponding APIC interrupt, which in turn could be used to launch an appropriate interrupt service routine for servicing the attack event. Such a service routine might log the event, and then inform the user or a remote management entity that an attack was detected. In other instances, the service routine could automatically shut the system down or otherwise switch the processor to a sleep state or the like so that the attacker could not access any information via the platform. Under yet another scheme, a remote management console or the like could be informed of the presence of a physical attack, enabling the attacker to be caught in the act.

Figure 3:
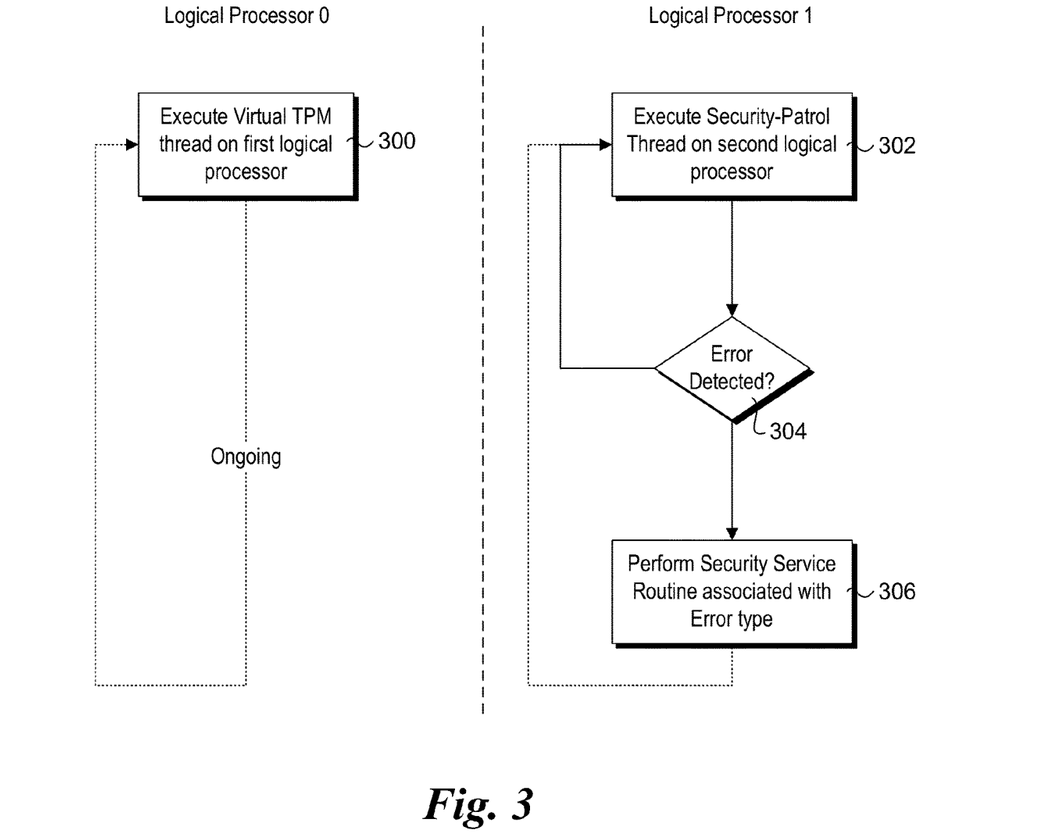
FIG. 3 is a flowchart illustrating concurrent operations performed by the virtual TPM thread and security-patrol thread of FIG. 2.

The foregoing aspects of the operation of one embodiment are illustrated in the flowchart of FIG. 3. In a block 300, the virtual TPM thread 206 is executed on a first logical processor (e.g., logical processor 0 of HT processor 200). The virtual TPM thread is executed as an ongoing process to support TPM functionality corresponding to the supported TPM features for the virtual TPM implementation. Concurrently, in a block 302, an instance of security-patrol thread 208 is executed on a second logical processor (e.g., logical processor 1 of HT processor 200). As indicated by a decision block 304 and a block 306, in response to a detected error, a security service routine associated with the error type is performed.

Figure 4:
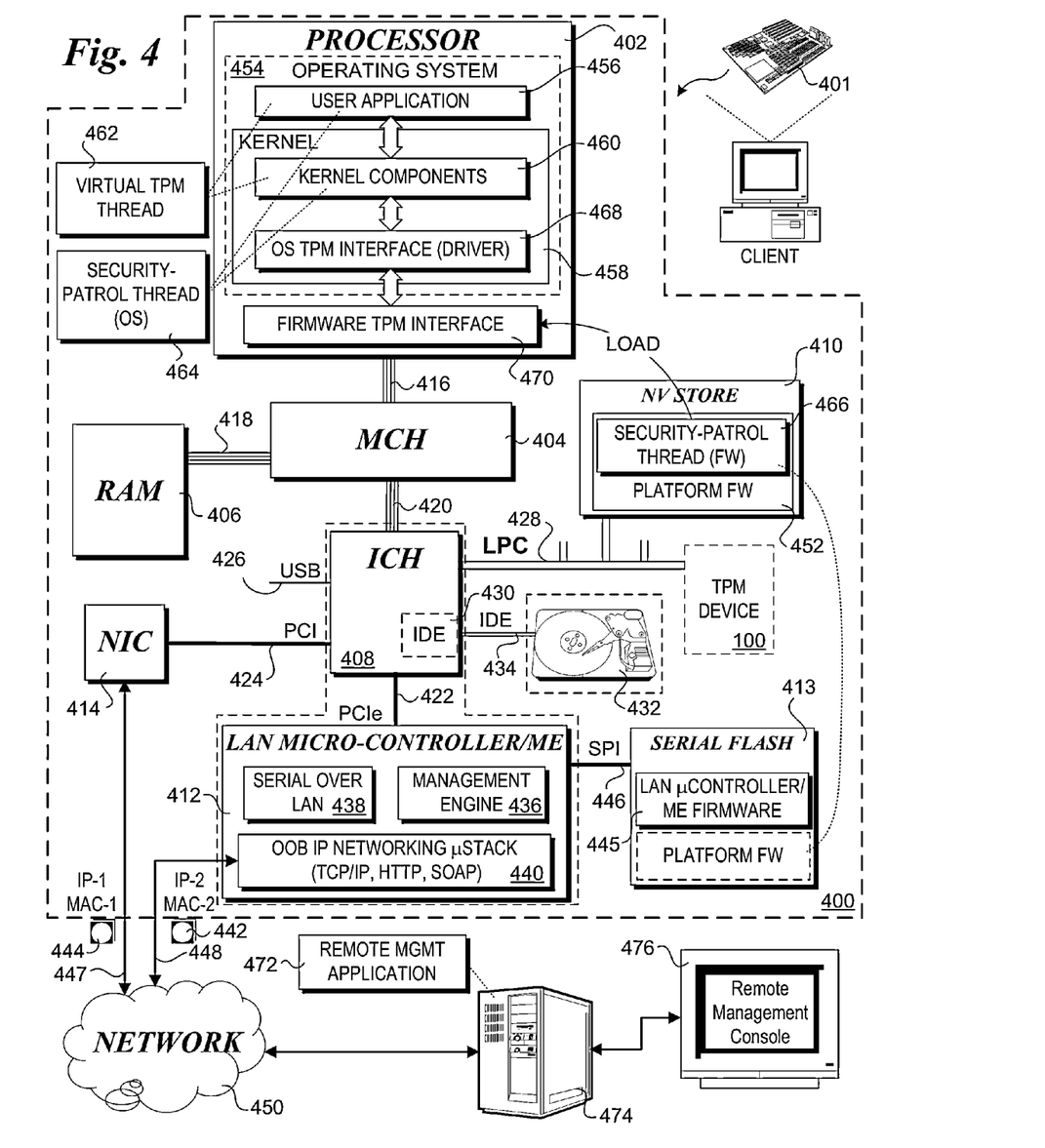
FIG. 4 is a is a schematic diagram of a computer system architecture including software and/or firmware components corresponding to each of the virtual TPM thread and security-patrol thread of FIG. 2 and further including a LAN microcontroller/ME component to facilitate out-of-band communication with a remote management application.

FIG. 4 shows a computer system architecture 400 that may be used to implement aspects of the tamper-aware virtual TPM embodiments discussed herein. The architecture includes various integrated circuit components mounted on motherboard or main system board 401. The illustrated components include a processor 402, a memory controller hub (MCH) 404, random access memory (RAM) 406, an input/output (I/O) controller hub (ICH) 408, a non-volatile (NV) store 410, a local area network (LAN) microcontroller (μC)/management engine (ME) 412, a serial flash chip 413, and a network interface controller 414. Processor 402 is coupled to MCH 404 via a bus 416, while MCH 404 is coupled to RAM 406 via a memory bus 418 and to ICH 408 via an I/O bus 420.

In the illustrated embodiment, ICH 408 is coupled to LAN microcontroller/ME 112 via a peripheral component interconnect (PCI) Express (PCIe) serial interconnect 422 and to NIC 414 via a PCI bus 424. Furthermore, various devices (not shown) in addition to NIC 414 may be connected to PCI bus 424, such as one or more PCI add-on peripheral cards, including sound cards, and video cards, for example. The ICH may is also be connected to various I/O devices via corresponding interfaces and/or ports. These include a universal serial bus (USB) port 426, and a low pin count (LPC) bus 428. In one embodiment, firmware store 410 is connected to ICH 408 via LPC bus 428.

In the illustrated embodiment, ICH 408 further includes an embedded integrated drive electronics (IDE) controller 430, which, in turn, is used to control one or more IDE disk drives 432 that are connected to the controller via an IDE interface 434. IDE controllers and IDE disk drives are the most common type of disk drive and controller found in modern PCs and laptop computers. Generally, in addition to the configuration shown, a separate (from ICH 408) IDE controller may be provided for controlling an IDE disk drive.

LAN microcontroller/ME 412 is configured to perform various operations that are facilitated via corresponding functional blocks. These include a management engine block 436, a serial over LAN block 438, and an out-of-band (OOB) Internet Protocol (IP) networking microstack 440. The OOB IP networking microstack 440 supports IP networking operations that enable external devices to communicate with LAN micro-controller/ME 412 via a conventional Ethernet connection. Accordingly, LAN micro-controller/ME 412 also provides a LAN μC Ethernet port 442. Meanwhile, NIC 414 also provides a separate NIC Ethernet port 444.

In another embodiment, the functions illustrated for ICH 408 and LAN micro-controller/ME 412 are facilitated by a single component, as depicted by the dashed-line box encompassing these components. For example, Intel's ICH8 chipset includes an integrated LAN micro-controller and management engine.

Figure 5:
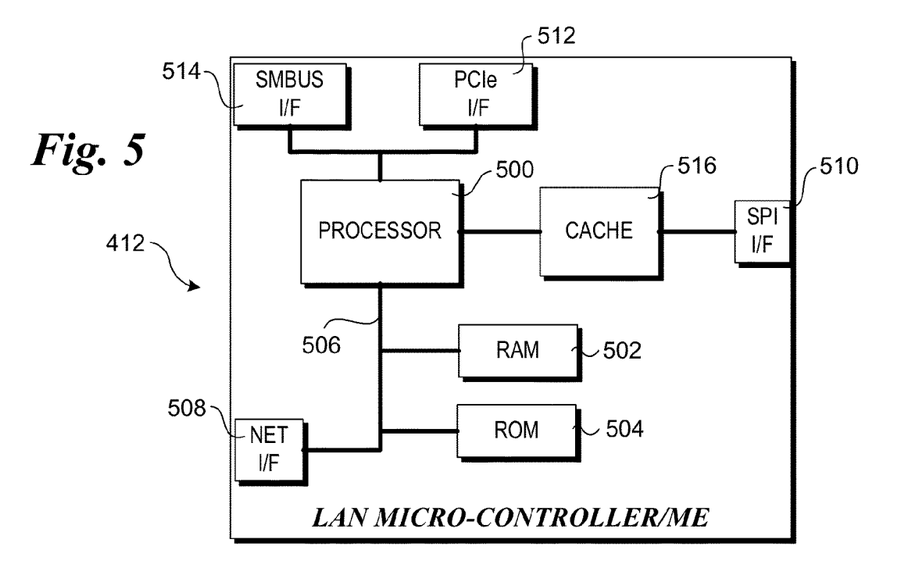
FIG. 5 is a schematic block diagram illustrating components of a LAN microcontroller/Management Engine used in the architectures of FIG. 4, according to one embodiment of the invention.

To effectuate the operation of its various functional blocks, LAN microcontroller/ME 412 loads firmware 445 from serial flash chip 413 and executes the firmware instructions on its built-in processor (further details on an exemplary LAN microcontroller/ME are shown in FIG. 5 and discussed below). In one embodiment, the transfer of data from serial flash chip 413 to LAN microcontroller/ME 412 is facilitated by a Serial Peripheral Interface (SPI) 446.

To facilitate concurrent and separate usage, each of NIC Ethernet port 444 and LAN μC Ethernet port 442 have respective media access control (MAC) addresses and respective IP addresses. For simplicity, the respective MAC addresses are depicted as MAC-1 and MAC-2, while the respective IP addresses are depicted as IP-1 and IP-2. In general, NIC Ethernet port 444 and LAN μC Ethernet port 442 support respective links 447 and 448 to network 450 using conventional LAN operations and protocols.

During platform initialization, various firmware components (depicted as platform firmware 452) are loaded and executed by processor 402 to prepare the platform for OS boot. In embodiments employing NV store 410, platform firmware 452 is loaded via LPC bus 428, ICH 408 and MCH 404. Under other configurations, such as the foregoing ICH8 configuration, the platform firmware is stored in serial flash 413 and loaded via the ICH. L After the pre-boot firmware operations are complete, an operating system 454 is booted, and OS run-time operations are made available. As with a typical operating system, OS 454 includes a user-application layer in which user applications 456 are run on an OS kernel 458 that includes various kernel components 460. Generally, OS 454 will be loaded from a local mass storage device such as disk drive 432, or will be loaded from a remote storage device via network 450 (i.e., via a network boot).

As discussed above, a virtual TPM may be implemented at an OS user-level application, in an OS kernel, or as a firmware component. Likewise, a security-patrol thread may be implemented as a user-level application, a kernel component, or as a firmware component. Accordingly, FIG. 4 shows a virtual TPM thread 462 and a security-patrol thread 464 being implemented as a user application 456 or a kernel component 460. FIG. 4 additionally shows a firmware-based security-patrol thread 466 being loaded on processor 402 for execution. Similarly, a firmware-based TPM thread (not shown) could be implemented at the firmware layer.

To support interactions with a TPM, various OS and firmware components are typically employed. These include an OS driver comprising an OS TPM interface 468, and a firmware driver comprising a firmware TPM interface 470. Under one implementation that employs a physical TPM device 100

(shown here only for illustrative purposes), the TPM device is accessed via LPC bus 428 using special processor cycles that are facilitated/managed by firmware TPM interface 470 and/or special microcode provided by processor 402.

Under a firmware-based virtual TPM thread, firmware TPM interface 470 abstracts the TPM functionality such that the virtual TPM thread appears as an actual physical TPM device 100 to OS TPM interface 468. Under a virtual TPM thread implemented at the kernel or user-application layer, firmware TPM interface 470 is by-passed (in fact, need not exist).

In accordance with further aspects of some embodiments, physical attacks on a managed client may be detected by a remote management application 472 running on a management server 474 using either an in-band or OOB management service. For example, under an OOB management service, remote management application 468 is enabled to communicate with computer system 100 via OOB communication services provided by LAN micro-controller/ME 412, while in-band management services are typically supported via a management agent running as a user applications or kernel component in conjunction with an OS-based IP network software stack (not shown). The primary difference between the in-band and OOB services is that the in-band service requires OS resources, while the OOB service does not (and in fact is transparent to the OS).

Under one OOB management embodiment, remote detection of a physical attack operates as follows. Security-patrol thread 466 detects a physical attack via the computational technique described above. In response, firmware TPM interface 470 notifies management engine 436 (e.g., directly, via an APIC interrupt service, etc.) of the type of attack detected. The management engine, which functions as a remote management agent, then uses Ethernet link 448 to host an OOB communication channel to communicate with remote management application 472 via network 450, with the attack being logged and/or displayed on a remote management console 476.

An in-band remote detection scheme works in a similar manner, except the scheme employs OS-layer software and in-band communication resources. In this case, the management agent function will typically be implemented at the OS kernel or user-application layer. Likewise, an instance of each of a virtual TPM thread 462 and a security-patrol thread 464 will be implemented at the OS kernel or user-application layer. In response to a detected attack, the security-patrol thread will inform the management agent, which in turn will employ the in-band networking facilities to communicate with remote management application 472 via network 450. In one embodiment, security-patrol thread 464 includes built-in management agent functionality.

FIG. 5 shows details of a hardware architecture corresponding to one embodiment of LAN microcontroller/ME 412. The LAN microcontroller/ME includes a processor 500, coupled to random access memory (RAM) 502, and read-only memory (ROM) 504 via a bus 506. The LAN microcontroller/ME further includes multiple I/O interfaces, including network interface 508, SPI interface 510, PCIe interface 512 and SMbus interface 514. In one embodiment, a cache 516 is coupled between processor 500 and SPI interface 510.

In general, the operations of the various components comprising OOB IP networking microstack 144, OOB web server 140, and diagnostic agent 142 may be facilitated via execution of instructions provided by LAN microcontroller firmware 150 (or other firmware stored on-board LAN microcontroller 112) on processor 1000. Additionally, the operations of SPI interface 156, PCIe interface 158 and SMbus interface 160 may be facilitated via hardware logic and/or execution of instructions provided by LAN microcontroller firmware 150 (or other firmware store on-board LAN microcontroller 112) on processor 1000. Furthermore, all or a portion of the firmware instructions may be loaded via a network store using the OOB communications channel. As discussed above, the various management console components may generally be embodied as sets of instructions corresponding to one or more software modules or applications.

FIG. 5 shows details of a hardware architecture corresponding to one embodiment of LAN microcontroller/ME 412. The LAN microcontroller/ME includes a processor 500, random access memory (ROM) 502, and read-only memory (ROM) 504. The LAN microcontroller/ME further includes multiple I/O interfaces, including a PCI Express interface 506, a controller network interface 508, and an SPI interface 510. In general, the operations of management engine 436, serial over LAN block 438, and OOB IP networking stack 140 may be facilitated via hardware logic and/or execution of instructions provided by LAN microcontroller/ME firmware 445 on processor 500.

As discussed, various operations and functions illustrated by corresponding functional blocks and the like depicted in the figures herein are implemented via execution of corresponding software and/or firmware instructions on a processor or the like. Thus, embodiments of this invention may be used as or to support software and firmware instructions executed upon some form of processing core or otherwise implemented or realized upon or within a machine-readable storage medium. A machine-readable storage medium includes any mechanism for storing or transmitting information in a form readable storage by a machine (e.g., a computer). For example, a machine-readable storage medium can include such as a read only memory (ROM); a random access memory (RAM); a magnetic disk storage media; an optical storage media; and a flash memory device, etc.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method comprising:
   executing a virtual trusted platform module (TPM) thread on a processor to facilitate a virtual TPM; and
   executing a security-patrol thread on the processor to detect a physical attack on the processor.

2. The method of claim 1, wherein the processor is a multi-threaded processor having multiple logical processors, and the virtual TPM thread is executed on a first logical processor while the security-patrol thread is executed on a second logical processor.

3. The method of claim 1, wherein the security-patrol thread is embodied as a firmware component.

4. The method of claim 1, wherein the security-patrol thread is embodied as an operating system kernel component.

5. The method of claim 1, wherein the security-patrol thread is embodied as an operating system user application.

6. The method of claim 1, wherein the security-patrol thread detects a physical attack on the processor by performing operations including:
performing a numerical calculation loop; and
monitoring for errors in results calculated by the numerical calculation loop, an error identifying the presence of a physical attack on the processor.

7. The method of claim 6, wherein the numerical calculation loop is designed to employ various logical blocks and elements of the processor to detect a physical attack implemented on portions of the processor proximate to those logical blocks and elements.

8. The method of claim 1 further comprising:
detecting a physical attack on the processor; and
providing information corresponding to detection of the physical attack to a remote management entity.

9. The method of claim 8, wherein the information is provided to the remote management entity using an out-of-band communication channel.

10. The method of claim 8, wherein the information is provided to the remote management entity using an in-band communication channel.

11. The method of claim 1, further comprising:
detecting a physical attack via the security-patrol thread; and
implementing a predefined security policy to be performed in response to a physical attack.

12. The method of claim 11, further comprising:
determining a type of physical attack; and
implementing a predefined security policy in view of the type of physical attack that is determined.

13. A machine-readable storage medium containing instructions that, when executed, cause a processor to perform a method, the method including:
executing a virtual trusted platform module (TPM) thread, to effect virtual TPM functionality; and
executing a security-patrol thread, to detect a physical attack on the processor.

14. The machine-readable storage medium of claim 13, wherein the security-patrol thread is embodied as a firmware component.

15. The machine-readable storage medium of claim 13, wherein the security-patrol thread is embodied as an operating system kernel component.

16. The machine-readable storage medium of claim 13, wherein the security-patrol thread is embodied as an operating system user application.

17. The machine-readable storage medium of claim 13, wherein execution of the security-patrol thread detects a physical attack on the processor by performing operations including:
performing a numerical calculation loop; and
monitoring for errors in results calculated by the numerical calculation loop, an error identifying the presence of a physical attack on the processor.

18. The machine-readable storage medium of claim 17, wherein the numerical calculation loop is designed to employ various logical blocks and elements of the processor to detect the physical attack implemented on portions of the processor proximate to those logical blocks and elements.

19. A computer system, comprising:
a multi-threaded processor;
a memory, operatively-coupled with the multi-threaded processor; and
at least one storage device, operatively-coupled with the multi-threaded processor, to store instructions to execute on the multi-threaded processor, the instructions including:
a virtual trusted platform module (TPM) thread, to effect virtual TPM functionality; and
a security-patrol thread, to detect a physical attack on the processor.

20. The computer system of claim 19, wherein the security-patrol thread comprises a firmware component.

21. The computer system of claim 20, further comprising:
a communications component operatively-coupled with the multi-threaded processor, the communication component having an embedded processor to execute instructions either stored on-board the communication component or in the at least one storage device to facilitate an out-of-band (OOB) communications channel.

22. The computer system of claim 20, further comprising:
instructions embodied as a management agent stored in the at least one storage device, wherein execution of the security-patrol thread and the management agent performs operations including:
detecting a physical attack on the multi-threaded processor; and
employing the OOB communication channel to inform a remote management entity that the physical attack on the processor has been detected.

23. The computer system of claim 20, wherein execution of the security-patrol thread detects the physical attack on the processor by performing operations including:
performing a numerical calculation loop; and
monitoring for errors in results calculated by the numerical calculation loop, an error identifying the presence of the physical attack on the processor.

* * * * *